Aug. 22, 1950     A. KRESTA     2,519,583
DRAFT REGULATOR FOR SMOKE PIPES

Filed July 21, 1947     2 Sheets-Sheet 1

Inventor
Alois Kresta
by
Douglas S. Johnson
Agent

Aug. 22, 1950   A. KRESTA   2,519,583
DRAFT REGULATOR FOR SMOKE PIPES
Filed July 21, 1947   2 Sheets-Sheet 2

Inventor
Alois Kresta
by
Douglas S. Johnson
Agent

Patented Aug. 22, 1950

2,519,583

UNITED STATES PATENT OFFICE 2,519,583

DRAFT REGULATOR FOR SMOKE PIPES

Alois Kresta, Toronto, Ontario, Canada, assignor to Prenco Progress and Engineering Corporation Limited, Toronto, Ontario, Canada Application July 21, 1947, Serial No. 762,475

4 Claims. (Cl. 236—45)

1

This invention relates to improvements in draft regulators for smoke pipes and particularly the smoke pipes of furnaces, and the principal object of the invention is to provide a means for easily and quickly setting the adjustment of the regulator valve for the desired maximum opening.

The principal feature of the invention consists in mounting upon an off-centre pivotally supported damper a rotatable member carrying a counterweight and adapted to move same quickly from a position closely adjacent the damper or to a position offset from the damper to impart a minimum and maximum of counter-balance for regulating the swing of the damper member on its offset pivot.

Figure 1:
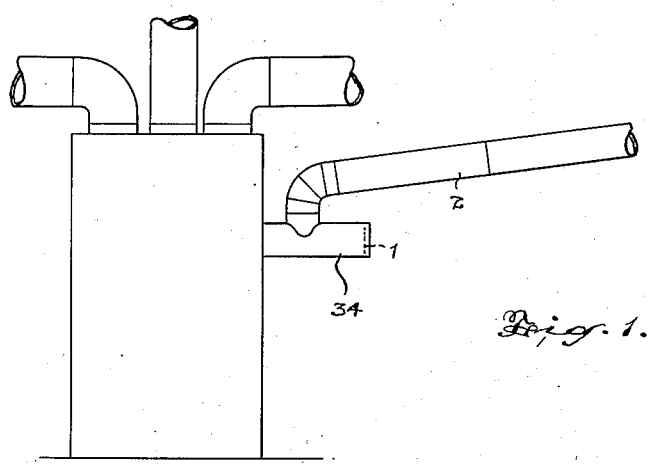
Figure 1 is an elevational view of a furnace showing the usual arrangement of the draft regulator.
Figure 2:
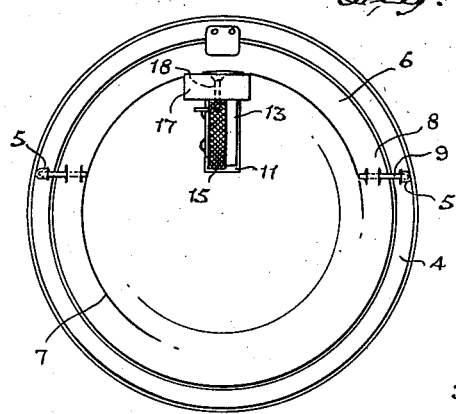
Figure 2 is an enlarged detail elevational view of a damper ring and damper equipped with my improved counterbalance and shown from the inward side of the smoke pipe.
Figure 3:
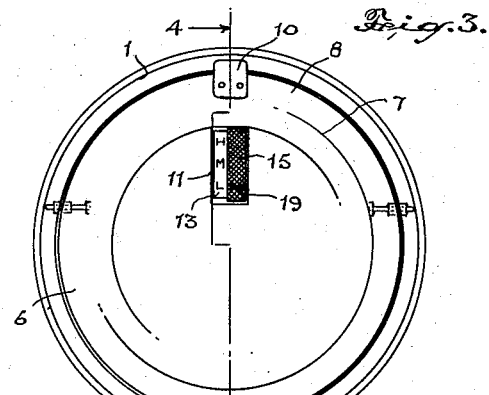
Figure 3 is an elevational view of the damper and ring shown in Figure 1 shown from the outward side.

In the operation of household furnaces it is particularly desirable that means be provided in the smoke vent to unify the flow of cold air through the grates and firebox, and numerous forms of draft regulators have been proposed and many of these are provided with pivotally mounted valves or dampers.

The present invention has been devised to provide an extremely simple form of damper unit for draft regulation and it consists of a collar 1

2 adapted to be inserted into an extension of the smoke pipe 2 having a limiting flange 3 on its outer end to abut the end of the smoke pipe, and an inturned annular flange 4 at the inner end.

The flange 4 is provided with pivot sockets 5 arranged a short distance above the horizontal centre line of the collar. A damper plate or valve 6 of circular form of slightly lesser outside diameter than the inside diameter of the flange 4 is formed with a stiffening bead 7 adjacent to its outer edge, and rigidly secured to the outer flat rim 8 of this damper 6 are pivot pins 9 which extend laterally into the pivot sockets 5 in the collar 1.

A small plate 10 is secured to or integrally formed on the outer rim 8 of the damper to overlap the flange 4 of the ring 1. This member forms a stop to hold the damper in a vertical position closing the opening in the ring 1.

In the form of damper illustrated in Figures 2 to 6 a slot 11 is cut in the central portion of the damper valve 6 on the inward side of the groove 7 and in cutting this portion of the damper the metal is turned out to form a lug or bracket 11'. A circular hub member 12 formed with an annular flange 13 at one side is secured to the bracket 11' by screws 14.

Rotatably mounted on the hub 12 between the flange 13 and the bracket 11' is a ring 15. This ring is free to turn on its bearing on the hub but is provided with a small spring-held brake shoe 16 to hold the ring firmly in adjusted positions.

A counterweight 17 shown in the form of a cylindrical metal bar is arranged transversely of the ring 15 and is secured thereto by a screw 18. The periphery of the ring 15 is preferably knurled and it is provided with a cross-notch 19 to indicate the position of the counterweight 17 relative to the damper on which it is mounted.

The periphery of the flange 13 of the hub 12 is preferably marked with indicator letters, here shown as the letters H, M, L, to indicate high, medium and low.

Figure 4:
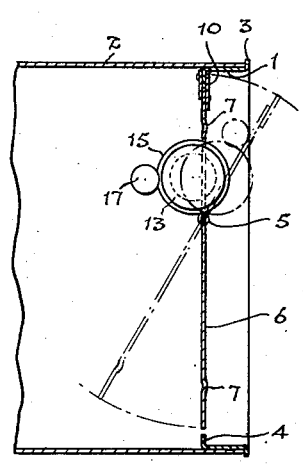
Figure 4 is a vertical sectional view through the damper taken on the line 4—4 of Figure 3.
Figures 5, 6:
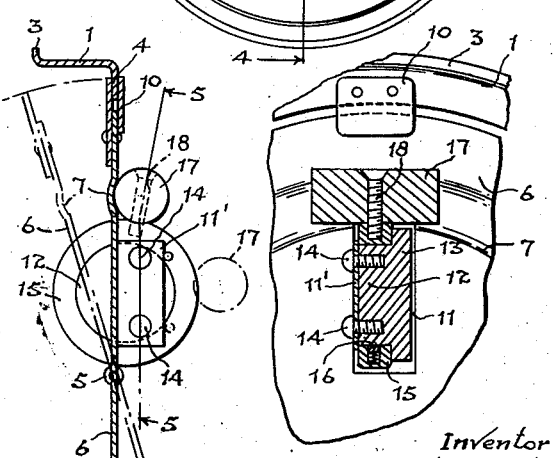
Figure 5 is an enlarged elevational view of the damper counterweight.
Figure 6 is a vertical sectional view through the counterweight taken on the line 6—6 of Figure 5.
Figure 7:
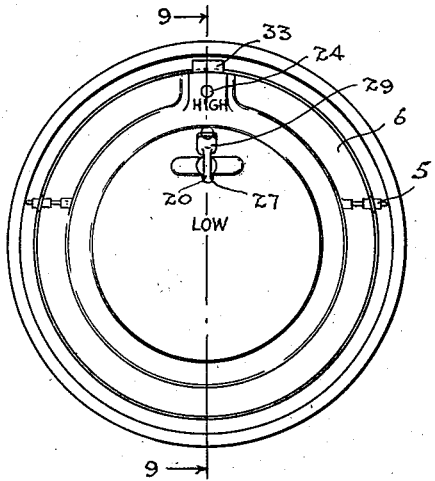
Figure 7 is an elevational view of a damper ring and damper equipped with an alternative counterbalance embodying my invention and shown from the output side of the smoke pipe.
Figure 8:
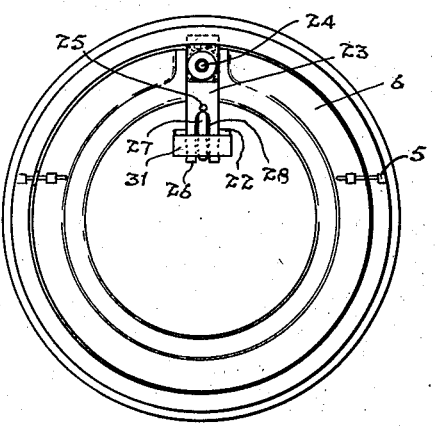
Figure 8 is an elevational view of the damper illustrated in Figure 7 but shown from the inward side of the smoke pipe.
Figure 9:
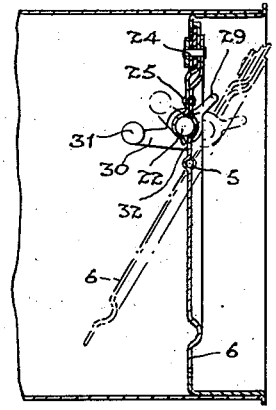
Figure 9 is a vertical sectional view taken through the damper on line 9—9 of Figure 7.
Figure 10:
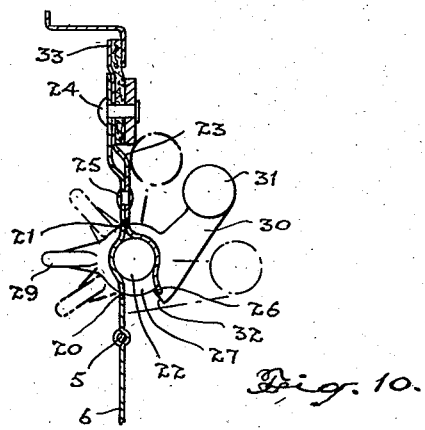
Figure 10 is an enlarged elevational view of the modified form of damper counterweight as illustrated in Figures 7, 8 and 9.

By turning the ring 15 on its supporting hub the counterweight 17 may be moved from the position shown in Figure 5 in full lines to the position indicated in dotted lines or as shown in full lines in Figure 4.

When the counterweight 17 is arranged close up to the damper 6 the weight of the hub member and its counter-weight are so positioned as to close the damper very lightly against the supporting ring, and the damper will swing very freely on its pivot in response to the suction of the draft created by the chimney, thus allowing air to enter the flue to mingle with the exhaust gases and to minimize the effect of the draft on the fire.

If, however, it is desirable to effect a greater resistance to the inflow of free air to the chimney flue the counterweight may be moved away from the damper disc by simply rotating the ring 15 and shifting the indicator notch 19 from low to medium or high.

When the indicator notch is moved opposite the indicia "H" the counterweight 17 will be moved to the position shown in full lines in Figure 4 and in dotted lines in Figure 5.

The suction of air created by the chimney will thus find greater resistance to the operation of the damper and will draw with greater strength upon the fire within the furnace.

In the modified form of damper and counterbalance illustrated in Figures 7 to 10, the damper valve 6 is provided with a slot 20 arranged on the vertical centre line above the pivot sockets 5, and a portion of the surface of the damper valve is bowed or curved outwardly either side of the slot to form a horizontal bearing seat 21 to receive a short length of rod 22.

A spring metal arm 23 secured at its upper end by suitable rivets 24 and 25 adjacent the top of the damper valve is formed with a curved free end 26 which engages over and is adapted to resiliently hold the rod 22 in the seat 21 for rotational movement.

Rigidly mounted on the central portion of the rod 22 is a peripheral hub member 27 which extends through the slot 20 in the damper plate and through a slot 28 in the curved end 26 of the arm 23. Extending radially outwardly from the hub member is an integral lever arm 29 which projects from the outward face of the damper valve and can be conveniently gripped to enable the hub and rod 22 to be rotated.

Formed as an integral part of the hub member 27 and arranged on the inward side of the damper valve is a second outwardly extending lever arm 30 which carries on its outward end a counterbalance 31 in the form of a transversely arranged cylindrical metal bar. The lever arms 29 and 30 are arranged at an obtuse angle, and the arm 30 which is arranged on the inward side of the damper valve is formed with a squared heel portion 32 adjacent the hub, which portion is adapted to engage the inward face of the damper valve to prevent the arm from swinging below a horizontal position.

Arranged at the top of the damper valve is a suitable stop 33 secured on the rivet 24 and adapted to abut against the outer face of the annular flange 4 to hold the damper valve 6 against reverse movement on its pivot pins.

In operating the counterbalance of Figures 7 to 10 the lever 29 extending from the front of the damper plate may be pulled downwardly to the position marked "Low" to rotate the rod 22 to swing the counterbalance inwardly against the inward face of the damper valve. In this position the damper valve operates with maximum sensitivity and is actuated by low or small variations of pressure in the chimney.

If the lever arm 29 is swung upwardly to the "High" position the counterbalance 31 is rotated outwardly from the damper plate to provide its maximum moment thus rendering the damper valve sensitive to only stronger pressure variations.

Intermediate positions of the lever arm will of course change the sensitivity of the damper accordingly.

It is important to note that the use of the spring metal arm 23 to hold the rod 22 in its bearing seat 21 will provide a strong clamping action to frictionally hold the rod from accidental rotation under the weight of the counterbalance. Thus the counterbalance will be positively retained in its adjusted position.

From the foregoing it will be readily understood that the manipulation of either form of the counterweight is extremely simple and that the pivotal operation of the damper may be gauged to suit the draft of the chimney and the operating conditions desired.

The damper is assembled in its pivotal support within the ring 1 and to apply it to a furnace installation it is merely necessary to slip the ring into the open end of the furnace pipe 34.

It will be understood that the device herein described is quite simple and cheap to manufacture and it is easily and quickly installed and when installed it will provide a very simply operated means for controlling and regulating the drafts of the furnace.

What I claim as my invention is:

1. A draft regulator comprising a ring adapted to be inserted into a furnace flue, a damper plate fitting within the opening of said ring and pivotally mounted on horizontal pivots to said ring, said damper plate having a slot cut therethrough centrally of its width and having the metal extending transversely each side of said slot deformed in a curved formation out of the plane of said plate, a spring arm secured to said plate and having a curved resilient cantilever fork extension overlying the deformed plate portions each side of said slot and defining therewith a clamp-like journal bearing, and a counterbalance having a hub seated in said journal bearing and urged into frictional contact with said deformed plate portions over a substantial portion of its periphery by said resilient fork extensions, an operating lever secured to said hub and extending through said slot, and a weighted lever arm extending between said fork extension, said counterbalance being held in adjusted rotational positions and against displacement relative said plate while being adjusted by said clamp-like journal bearing formed in a substantial part by said deformed plate portions.

2. A device as claimed in claim 1 in which said weighted lever arm is formed with a projection at said hub projecting beyond the periphery of said hub to engage said damper plate and form a stop against rotational movement of said hub with said weighted arms substantially at right angles to said damper plate.

3. A draft regulator comprising a ring adapted to be inserted into a furnace flue, a damper fitting within the opening of said ring pivotally mounted on horizontal pivots in said ring above the transverse axis, said damper plate having a slot therein centrally of its width above said transverse axis and having the metal extending transversely each side of said slot deformed in a curved formation out of the plane of said plate, a spring arm secured to said plate and having a curved resilient cantilever fork extension overlying the deformed plate portions each side of said slot and defining therewith a clamp-like journal bearing, and a counterbalance having a hub seated in said journal bearing and urged into frictional contact with said deformed plate portions over a substantial portion of its periphery by said resilient fork extensions, an operating lever secured to said hub and extending through said slot, and a weighted lever arm extending between said fork extension, said counterbalance being held in adjusted rotational positions and against displacement relative said plate while being adjusted by said clamp-like journal bearing formed in a substantial part by said deformed plate portions.

4. In a draft regulator, a damper plate having a transverse trough-like arcuate formation pressed in the surface thereof, a spring arm secured to said damper plate having a forked resilient cantilever extension overlying said transverse arcuate formation and curved complementary to the curve of said arcuate formation to define therewith a resilient clamp-like journal bearing formed in substantial part by the surface of said damper plate, and a counterbalance supported for rotation only solely by said plate and said spring arm comprising a hub mounted in said clamp like journal bearing and rotatable therein under friction of said forked extension and damper plate, an operating lever arm projecting through said damper plate, and a weighted arm projecting through said forked extension, said lever arms being rigid with said hub.

ALOIS KRESTA.

REFERENCES CITED

The following references are of record in the file of this patent:

UNITED STATES PATENTS

| Number | Name | Date |
|---|---|---|
| 2,004,947 | Irsch et al. | June 18, 1935 |
| 2,067,872 | Bray | Jan. 12, 1937 |
| 2,289,579 | Klermund et al. | July 14, 1942 |
| 2,335,740 | Cole | Nov. 30, 1943 |
| 2,460,538 | Schneider | Feb. 1, 1949 |